United States Patent
Lee et al.

(10) Patent No.: US 8,405,487 B2
(45) Date of Patent: Mar. 26, 2013

(54) RFID SENSOR TAG AND SENSOR DATA STORING METHOD

(75) Inventors: Kang-bok Lee, Daejeon-si (KR);
Sang-yeoun Lee, Daejeon-si (KR);
Heyung-sub Lee, Daejeon-si (KR);
Jong-suk Chae, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 558 days.

(21) Appl. No.: 12/629,451

(22) Filed: Dec. 2, 2009

(65) Prior Publication Data

US 2010/0141404 A1 Jun. 10, 2010

(30) Foreign Application Priority Data

Dec. 10, 2008 (KR) .................... 10-2008-0125366

(51) Int. Cl.
*H04Q 5/22* (2006.01)
(52) U.S. Cl. .............. 340/10.51; 340/435; 340/539.1; 711/100
(58) Field of Classification Search .............. None
See application file for complete search history.

(56) References Cited

U.S. PATENT DOCUMENTS

| 4,914,688 | A | * | 4/1990 | Kobayashi et al. | ........ 379/93.29 |
| 5,016,279 | A | * | 5/1991 | Kawama et al. | ........ 704/230 |
| 5,744,739 | A | * | 4/1998 | Jenkins | ........ 84/603 |
| 7,538,678 | B2 | | 5/2009 | Jung et al. | |
| 2005/0148828 | A1 | * | 7/2005 | Lindsay | ........ 600/300 |
| 2008/0211638 | A1 | * | 9/2008 | Masui et al. | ........ 340/10.51 |

FOREIGN PATENT DOCUMENTS

| JP | 2007-85780 A | 4/2007 |
| KR | 10-2005-0012389 | 2/2005 |
| KR | 10-2005-0098428 A | 10/2005 |
| KR | 10-0653180 B1 | 12/2006 |
| KR | 10-0821518 B1 | 4/2008 |

\* cited by examiner

*Primary Examiner* — Daniel Wu
*Assistant Examiner* — Frederick Ott
(74) *Attorney, Agent, or Firm* — Kile Park Reed & Houtteman PLLC

(57) ABSTRACT

A method of storing sensor data in a sensor tag is provided. The method comprises receiving new sensor data output from a sensor, comparing the received new sensor data with immediately previous sensor data to determine whether the comparison result satisfies a predetermined criterion, and storing the new sensor data in a tag memory when it is determined that the criterion is satisfied. Accordingly, efficient use of the tag memory is possible.

12 Claims, 3 Drawing Sheets

RFID SENSOR TAG AND SENSOR DATA STORING METHOD

CROSS REFERENCE TO RELATED APPLICATION

This application claims the benefit under 35 U.S.C. §119(a) of Korean Patent Application No. 10-2008-0125366, filed on Dec. 10, 2008, the disclosure of which is incorporated herein in its entirety by reference.

BACKGROUND

1. Field

The following description relates to a radio frequency identification (RFID) technology, and more particularly, to an RFID sensor tag.

2. Description of the Related Art

A radio frequency identification (RFID) technology is a technology that allows pieces of information to be read out from RFID tags applied to products or objects over a short distance by use of radio frequencies. A tag to be applied to a product contains all kinds of information on production, distribution and customer. Therefore, through the RFID tag, the information can be transferred to other information systems. An RFID system comprises of an RFID tag for storing information and for exchanging information through a wireless protocol and an RFID reader for RF communication with the RFID tag. There are generally two types of RFID tags, active RFID tags and passive RFID tags, depending on whether a self-power supply is present. The active RFID tags contain a battery and operate autonomously and the passive RFID tags have no battery and extract power components from contiguous electromagnetic waves output from the RFID reader and received through an antenna to generate power. The active RFID tags have advantages in reducing the required power of an appropriate RFID reader and having an increased recognition distance, but have limitations in price and application since the RFID tags include a power supply. On the other hand, the passive RFID tags are inexpensive and can be used semi-permanently, but have a shorter recognition distance, make the RFID reader use more power and cannot store as much data as the active RFID tags can.

With the expansion in use of the RFID tags in various fields of technology and the diversification of applications, functions of the RFID tags have become more varied. In particular, the amount of data to be stored in an RFID tag for simple product management may be only several bytes, but a sensor tag such as a ubiquitous sensor network (USN) may store data of several thousand bytes. In the storing of data sensed via a sensor, the sensor tag can enhance the efficiency of the sensor and more appropriately function as the amount of data to be stored in a memory space increases.

However, as the amount of data to be stored in the sensor tag increases, the capacity of a memory becomes larger, resulting in an increase in power consumption. If the power consumption increases, a passive sensor tag cannot be used. Moreover, even if the sensor tag is of an active type, the lifetime of a battery is shortened, causing various limitations in use. Especially, since the memory of an RFID tag is generally non-volatile, processes of erasing current data and writing a value of new data have to be performed in order to write the new data. Furthermore, since a high voltage is required for the processes, the total power consumption may be increased.

SUMMARY

Accordingly, in one aspect, there is provided a technology for using a memory efficiently by preventing a large amount of data from being unnecessarily stored in a tag memory.

According to one aspect, there is provided a sensor tag including a sensor unit to sense at least one piece of sensor data; a radio frequency (RF) communication unit to perform wireless transmission and receiving of a signal with a radio frequency identification (RFID) reader; a storage unit to store commands and data for tag operation and the sensor data obtained by the sensor unit; and a control unit to compare new sensor data of the sensor unit with immediately previous sensor data and write the new sensor data in the storage unit when the comparison result satisfies a predetermined criterion.

The control unit may include a sensor register to store the new sensor data of the sensor unit, a memory register to store the immediately previous sensor data of the sensor unit and a comparison unit to compare the new sensor data stored in the sensor register with the immediately previous sensor data stored in the memory register to determine whether a value of the comparison result satisfies the criterion.

According to another aspect, there is provided a method of storing sensor data in a sensor tag, including: receiving new sensor data output from a sensor; comparing the received new sensor data with immediately previous sensor data to determine whether a value of the comparison result satisfies a predetermined criterion; and storing the new sensor data in a tag memory when it is determined that the criterion is satisfied.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
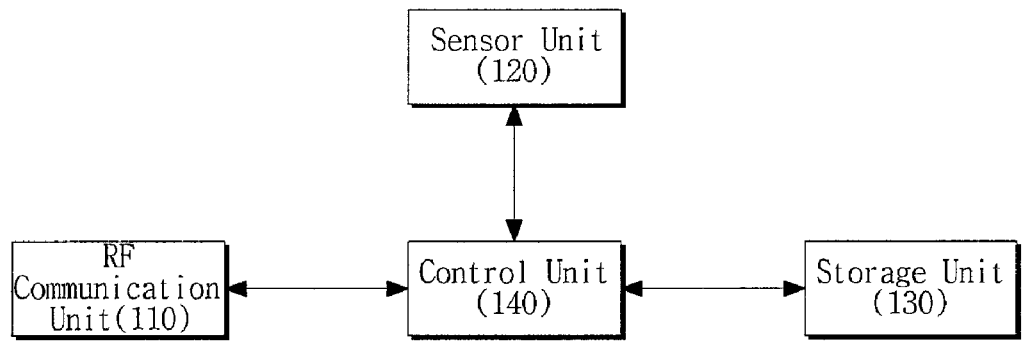
FIG. 1 is a block diagram illustrating a radio frequency identification (RFID) sensor tag according to a related art.

FIG. 1 is a block diagram illustrating a general radio frequency identification (RFID) sensor tag. As shown in FIG. 1, the general RFID sensor tag includes a radio frequency (RF) communication unit 110, a sensor unit 120, a storage unit 130, and a control unit 140. The RF communication unit 110 is formed of an RF modulator and demodulator to provide RF signal transmission/reception with an RFID reader. The sensor unit 120 includes at least one sensor, and senses various conditions. The storage unit 130 stores commands and data necessary for tag operation and the sensor data of the sensor unit 120. The control unit 140 is configured to control the general operation of the sensor tag and is operated in response to the commands stored in the storage unit 130. In detail, the control unit 140 controls the communication with the read RFID, processing of the sensor data, and the storage unit 130.

The sensor data input from the sensor unit 120 is written in a memory address of a storage unit 130 which is automatically allocated in advance by the control unit 140. For example, if the sensor unit 120 is set to perform sensing operation in every ten minutes, the control unit 140 processes the sensor data output from the sensor unit 120 every ten minutes and stores the processed sensor data in the storage unit 130. Generally, the sensor data consists of a sensor value and a time value. The amount of data of one interval is generally about 8 bytes (32 bit sensor data+32 bit timestamp). Therefore, a sensor tag chip with a capacity of 1 Kbit only can store sensor data for about three hours. Although the storage capability of the sensor tag chip differs with a sensing interval and the amount of data, a memory address is automatically allocated for newly input sensor data to be written on storage even when the new sensor data is the same as the previously stored sensor data.

Figure 2:
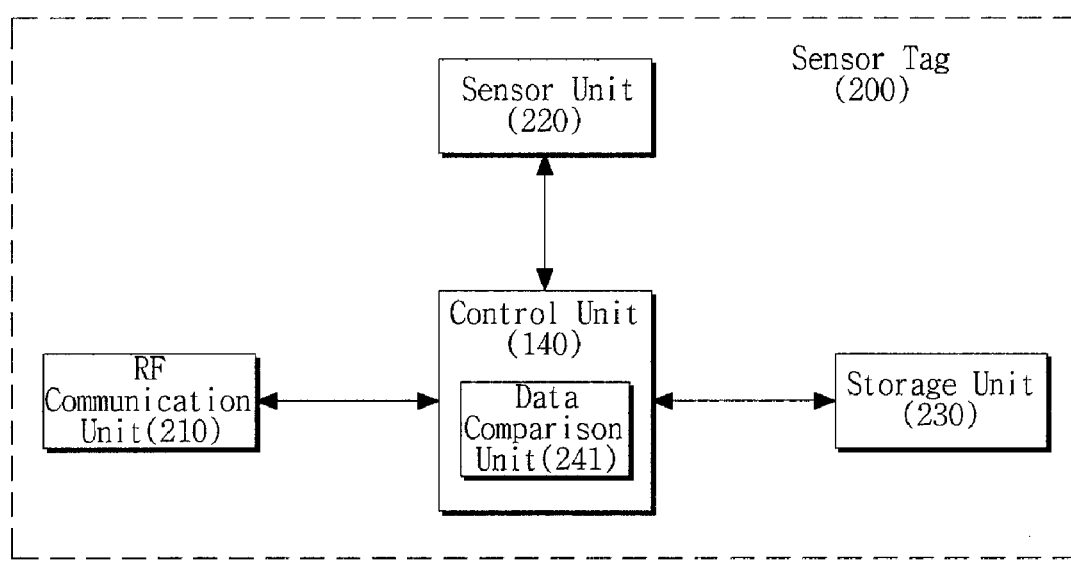
FIG. 2 is a block diagram illustrating a sensor tag according to an exemplary embodiment.

FIG. 2 is a block diagram illustrating a sensor tag 200 according to an exemplary embodiment. As shown in FIG. 2, the sensor tag 200 includes an RF communication unit 210, a sensor unit 220, a storage unit 230, and a control unit including a data comparison unit 241. Although not illustrated, the sensor tag 200 includes a self-power supplying unit since the sensor tag 200 is an active sensor tag. The RF communication unit 210 includes an antenna, a modulator, and a demodulator. The antenna is a printed pattern or a coil formed roughly along a circumference of the sensor tag 200. The modulator is configured to modulate a signal received from the RFID reader, and the demodulator is configured to demodulate a signal to be transmitted to the RFID reader. The RF communication unit 210 is well known to those skilled in the art, and thus a description of its structure will be omitted.

The sensor unit 220 includes at least one sensor. The sensor included in the sensor unit 220 may be one of a temperature sensor, a pressure sensor, a humidity sensor, an illumination sensor, a bio sensor, and the like. The sensor unit 220 is active under the control of the control unit 240. For example, the sensor unit 220 operates periodically (e.g., every 5 minutes). The storage unit 230 is a non-volatile semiconductor memory such as Flash ROM. The storage unit 230 stores commands and tag identifier information which are necessary for tag operation, and stores the sensor data output from the sensor unit 220.

The control unit 240 is configured to control the general operation of the sensor tag 200, and may be implemented as a piece of digital logic specific hardware designed as a state machine, for example, an application-specific integrated circuit (ASIC) which is designed based on the flip-flop and a gate. The control unit 240 determines whether new sensor data output from the sensor unit 220 satisfies a criterion and stores the sensor data in the storage unit 230 or discards it based on the result of the determination.

Figure 3:
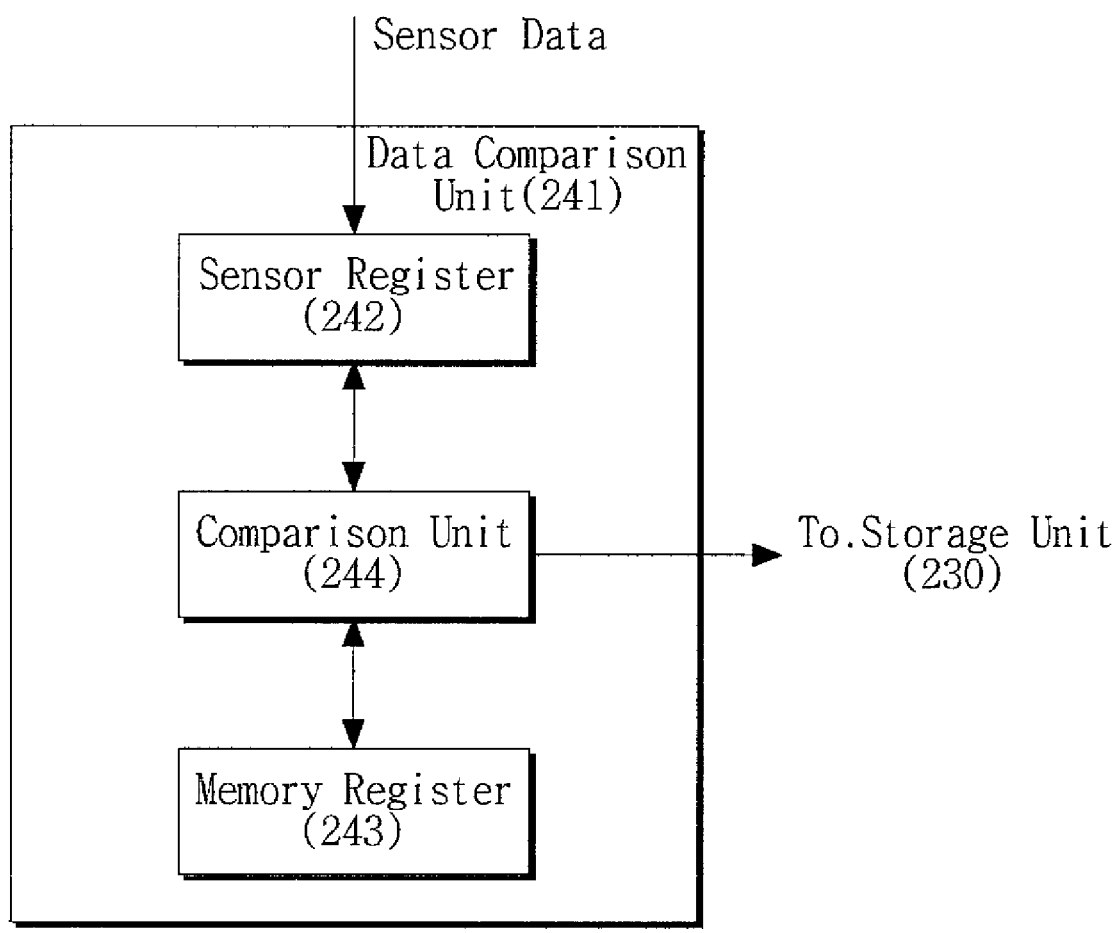
FIG. 3 is a block diagram illustrating an example of the data comparison unit of FIG. 2.

The control unit 240 includes the data comparison unit 241. FIG. 3 is a block diagram illustrating an example of the data comparison unit 241. As shown in FIG. 3, the data comparison unit 241 includes a sensor register 242, a memory register 243, and a comparison unit 244. The sensor register 242 stores the new sensor data output from the sensor unit 220. The memory register 243 stores immediately previous sensor data output from the sensor unit 220. The comparison unit 244 is a circuit to compare values of the sensor register 242 and the memory register 243. The comparison unit 244 compares the values of the sensor register 242 and the memory register 243 to determine whether the new sensor data satisfies a predetermined criterion. In one example, reference data is stored in the storage unit 230, and the reference data can be changed by the RFID reader. The sensor data to be compared may be output from the same sensor.

If the result of the comparison does not satisfy the predetermined criterion, the control unit 240 does not store the new sensor data in the storage unit 230$m$, but discards it. On the other hand, if the result of the comparison satisfies the predetermined criterion, the control unit 240 stores the new sensor data in the storage unit 230. In addition, the new sensor data is overwritten on the memory register 243 to be utilized as immediately previous data. In another example, the registers 242 and 243 may not be included, but the control unit 240 may read out immediately previous data from the storage unit 230 each time a comparison is performed, and compares current sensor data with the immediately previous data.

The determination of the comparison result from the data comparison unit 241 may vary according to memory management policy of the sensor tag 200. For example, the determination of whether to store new sensor data in the storage unit may vary according to a criterion for comparison, e.g., the frequency of sensor data becoming present, a capacity of a tag memory, and user settings. If a sensor is used frequently, the amount of sensor data output from the sensor increases, and thus pieces of sensor data from the same sensor can be determined to have the same value even when there is a slight difference in the comparison results. Alternatively, if the capacity of the storage unit 230 is large or the frequency of operation of the sensor is low, the comparison criterion may be more specific. That is, it is possible for the determination criterion of the data comparison unit 241 to be set by a user. The criterion may vary with consideration of the following factors.

Frequency of operation of a sensor: the criterion may vary according to how often a sensor is used.

The amount of sensor data: the criterion may vary according to the amount of sensor data to be stored in a memory.

The capacity of a memory: the criterion may vary according to the capacity of a memory inside a tag.

Use environment or application method of a sensor: a sensing interval may vary with the purpose of a sensor (e.g., temperature monitoring, illumination monitoring, and pressure observation), and the criterion may, accordingly, be changed.

Frequency and method of communications between a tag and a reader: since sensor data which has been already read by an RFID reader does not need to be stored, frequency of storing is increased if the tag communicates with the RFID reader frequently, and otherwise the frequency of storing is lowered.

Figure 4:
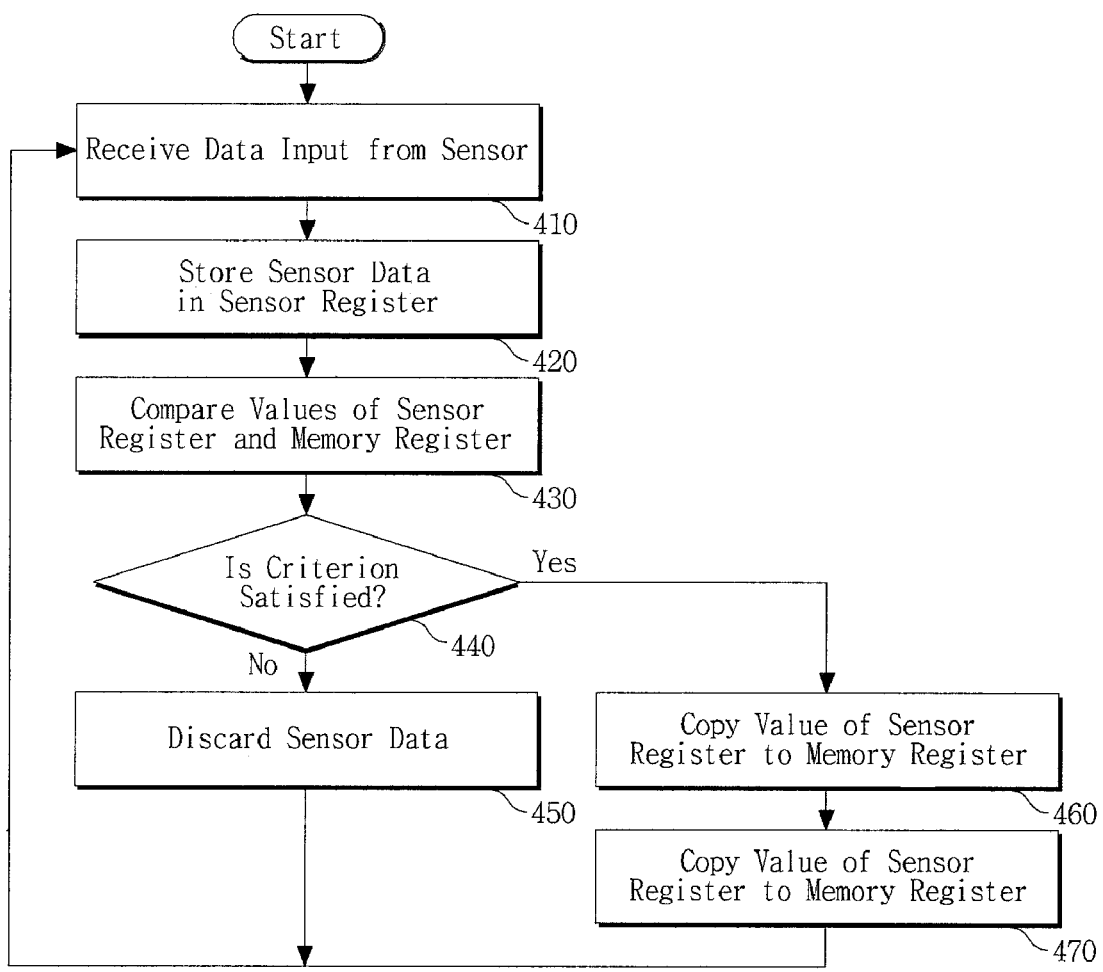
FIG. 4 is a flowchart illustrating a method of storing sensor data according to an exemplary embodiment.

FIG. 4 is a flowchart illustrating a method of storing sensor data according to an exemplary embodiment. The method of storing sensor data will be described with reference to FIG. 4 in conjunction with FIG. 2.

The control unit 240 receives sensor data input from the sensor unit 220 (operation 410). The received sensor data is stored in the sensor register 242 (operation 420). The comparison unit 244 compares a value of the sensor register 242 which stores the new sensor data with a value of the memory register 243 which stores immediately previous sensor data (operation 430). It is determined whether the value of the comparison result satisfies a predetermined criterion (operation 440). If the criterion is not satisfied, the new sensor data stored in the sensor register 242 is not stored in the storage unit 230, but is discarded (operation 450). If the criterion is satisfied, the value stored in the sensor register 242 is overwritten on the memory register 243 (operation 460). Then, the value of the memory register 243 is stored in the storage unit 230 (operation 470). Meanwhile, in operation 450, the sensor data may not be completely discarded, but may be copied to the memory register 243. This is because the sensor data can be utilized as immediately previous data with respect to subsequent sensor data. As described above, reference data to be used for comparison may vary with the frequency of sensor data becoming present, the capacity of a tag memory, and user settings.

Accordingly, in the storing of data sensed by a sensor, allocation of memory space can be determined by comparing current sensor data with immediately previous sensor data. Therefore, it is possible to store a large amount of sensor data obtained for a long period of time in a memory space of a sensor tag. In addition, the capacity of the memory can be minimized if necessary, thereby reducing the size of the sensor tag and reducing power consumption.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A sensor tag comprising:
a sensor unit configured to sense at least one piece of sensor data;
a radio frequency (RF) communication unit configured to perform wireless transmission and receiving of a signal with a radio frequency identification (RFID) reader;
a storage unit configured to store commands and data for tag operation and the sensor data obtained by the sensor unit; and
a control unit configured to compare new sensor data of the sensor unit with immediately previous sensor data of the sensor unit and write the new sensor data in the storage unit when the comparison result satisfies a predetermined criterion,
wherein the control unit comprises a sensor register configured to store the new sensor data of the sensor unit, a memory register configured to store the immediately previous sensor data of the sensor unit, and a comparison unit configured to compare the new sensor data stored in the sensor register with the immediately previous sensor data stored in the memory register to determine whether the comparison result satisfies the criterion,
wherein the control unit is configured to overwrite the new sensor data over the immediately previous sensor data on the memory register after determining that the comparison result satisfies the criterion, and
wherein the criterion varies according to frequency of operation of the sensor unit.

2. The sensor tag of claim 1, wherein the control unit is configured to discard the new sensor data when the comparison result does not satisfy the criterion.

3. A sensor tag comprising:
a sensor unit configured to sense at least one piece of sensor data;
a radio frequency (RF) communication unit configured to perform wireless transmission and receiving of a signal with a radio frequency identification (RFID) reader;
a storage unit configured to store commands and data for tag operation and the sensor data obtained by the sensor unit; and
a control unit configured to compare new sensor data of the sensor unit with immediately previous sensor data of the sensor unit and write the new sensor data in the storage unit when the comparison result satisfies a predetermined criterion,
wherein the control unit comprises a sensor register configured to store the new sensor data of the sensor unit, a memory register configured to store the immediately previous sensor data of the sensor unit, and a comparison unit configured to compare the new sensor data stored in the sensor register with the immediately previous sensor data stored in the memory register to determine whether the comparison result satisfies the criterion,
wherein the control unit is configured to overwrite the new sensor data over the immediately previous sensor data on the memory register after determining that the comparison result satisfies the criterion, and
wherein the criterion varies according to the size of the sensor data output from the sensor unit.

4. A sensor tag comprising:
a sensor unit configured to sense at least one piece of sensor data;
a radio frequency (RF) communication unit configured to perform wireless transmission and receiving of a signal with a radio frequency identification (RFID) reader;
a storage unit configured to store commands and data for tag operation and the sensor data obtained by the sensor unit; and
a control unit configured to compare new sensor data of the sensor unit with immediately previous sensor data of the sensor unit and write the new sensor data in the storage unit when the comparison result satisfies a predetermined criterion,
wherein the control unit comprises a sensor register configured to store the new sensor data of the sensor unit, a memory register configured to store the immediately previous sensor data of the sensor unit, and a comparison unit configured to compare the new sensor data stored in the sensor register with the immediately previous sensor data stored in the memory register to determine whether the comparison result satisfies the criterion,
wherein the control unit is configured to overwrite the new sensor data over the immediately previous sensor data on the memory register after determining that the comparison result satisfies the criterion, and
wherein the criterion varies according to the capacity of the storage unit.

5. A sensor tag comprising:
a sensor unit configured to sense at least one piece of sensor data;
a radio frequency (RF) communication unit configured to perform wireless transmission and receiving of a signal with a radio frequency identification (RFID) reader;
a storage unit configured to store commands and data for tag operation and the sensor data obtained by the sensor unit; and
a control unit configured to compare new sensor data of the sensor unit with immediately previous sensor data of the sensor unit and write the new sensor data in the storage unit when the comparison result satisfies a predetermined criterion,
wherein the control unit comprises a sensor register configured to store the new sensor data of the sensor unit, a memory register configured to store the immediately previous sensor data of the sensor unit, and a comparison unit configured to compare the new sensor data stored in the sensor register with the immediately previous sensor data stored in the memory register to determine whether the comparison result satisfies the criterion, wherein the control unit is configured to overwrite the new sensor data over the immediately previous sensor data on the memory register after determining that the comparison result satisfies the criterion, and wherein the criterion varies according to a type of data to be obtained by the sensor unit.

6. A sensor tag comprising:

a sensor unit configured to sense at least one piece of sensor data;

a radio frequency (RF) communication unit configured to perform wireless transmission and receiving of a signal with a radio frequency identification (RFID) reader;

a storage unit configured to store commands and data for tag operation and the sensor data obtained by the sensor unit; and a control unit configured to compare new sensor data of the sensor unit with immediately previous sensor data of the sensor unit and write the new sensor data in the storage unit when the comparison result satisfies a predetermined criterion, wherein the control unit comprises a sensor register configured to store the new sensor data of the sensor unit, a memory register configured to store the immediately previous sensor data of the sensor unit, and a comparison unit configured to compare the new sensor data stored in the sensor register with the immediately previous sensor data stored in the memory register to determine whether the comparison result satisfies the criterion, wherein the control unit is configured to overwrite the new sensor data over the immediately previous sensor data on the memory register after determining that the comparison result satisfies the criterion, and wherein the criterion varies according to the frequency of communication between the sensor tag and the RFID reader.

7. A method of storing sensor data in a sensor tag, wherein the method is performed by the sensor tag, the method comprising:

receiving sensor data output from a sensor of the sensor tag;

comparing newly received sensor data of the sensor with immediately previous sensor data of the sensor to determine whether the comparison result satisfies a predetermined criterion;

storing the newly received sensor data in a tag memory of the sensor tag when it is determined that the criterion is satisfied;

prior to determining whether the comparison result satisfies the predetermined criterion, storing the newly received sensor data in a sensor register of a control unit of the sensor tag and storing the immediately previous sensor data in a memory register of the control unit; and overwriting the newly received sensor data over the immediately previous sensor data on the memory register when it is determined that the criterion is satisfied, wherein the criterion varies according to frequency of operation of the sensor.

8. The method of claim 7, further comprising:

discarding the newly received sensor data when it is determined that the criterion is not satisfied.

9. A method of storing sensor data in a sensor tag, wherein the method is performed by the sensor tag, the method comprising:

receiving sensor data output from a sensor of the sensor tag;

comparing newly received sensor data of the sensor with immediately previous sensor data of the sensor to determine whether the comparison result satisfies a predetermined criterion;

storing the newly received sensor data in a tag memory of the sensor tag when it is determined that the criterion is satisfied;

prior to determining whether the comparison result satisfies the predetermined criterion, storing the newly received sensor data in a sensor register of a control unit of the sensor tag and storing the immediately previous sensor data in a memory register of the control unit; and overwriting the newly received sensor data over the immediately previous sensor data on the memory register when it is determined that the criterion is satisfied, wherein the criterion varies according to the size of the sensor data output from the sensor.

10. A method of storing sensor data in a sensor tag, wherein the method is performed by the sensor tag, the method comprising:

receiving sensor data output from a sensor of the sensor tag;

comparing newly received sensor data of the sensor with immediately previous sensor data of the sensor to determine whether the comparison result satisfies a predetermined criterion;

storing the newly received sensor data in a tag memory of the sensor tag when it is determined that the criterion is satisfied;

prior to determining whether the comparison result satisfies the predetermined criterion, storing the newly received sensor data in a sensor register of a control unit of the sensor tag and storing the immediately previous sensor data in a memory register of the control unit; and overwriting the newly received sensor data over the immediately previous sensor data on the memory register when it is determined that the criterion is satisfied, wherein the criterion varies according to the capacity of the tag memory.

11. A method of storing sensor data in a sensor tag, wherein the method is performed by the sensor tag, the method comprising:

receiving sensor data output from a sensor of the sensor tag;

comparing newly received sensor data of the sensor with immediately previous sensor data of the sensor to determine whether the comparison result satisfies a predetermined criterion;

storing the newly received sensor data in a tag memory of the sensor tag when it is determined that the criterion is satisfied;

prior to determining whether the comparison result satisfies the predetermined criterion, storing the newly received sensor data in a sensor register of a control unit of the sensor tag and storing the immediately previous sensor data in a memory register of the control unit; and overwriting the newly received sensor data over the immediately previous sensor data on the memory register when it is determined that the criterion is satisfied, wherein the criterion varies according to a type of data to be obtained by the sensor unit.

12. A method of storing sensor data in a sensor tag, wherein the method is performed by the sensor tag, the method comprising:
- receiving sensor data output from a sensor of the sensor tag;
- comparing newly received sensor data of the sensor with immediately previous sensor data of the sensor to determine whether the comparison result satisfies a predetermined criterion;
- storing the newly received sensor data in a tag memory of the sensor tag when it is determined that the criterion is satisfied;
- prior to determining whether the comparison result satisfies the predetermined criterion, storing the newly received sensor data in a sensor register of a control unit of the sensor tag and storing the immediately previous sensor data in a memory register of the control unit; and
- overwriting the newly received sensor data over the immediately previous sensor data on the memory register when it is determined that the criterion is satisfied, wherein the criterion varies according to frequency of communications between the sensor tag and an RFID reader.

* * * * *